US009035764B2

(12) United States Patent
Karaoguz et al.

(10) Patent No.: US 9,035,764 B2
(45) Date of Patent: May 19, 2015

(54) ACCESS, MONITORING, AND CONTROL OF APPLIANCES VIA A MEDIA PROCESSING SYSTEM

(71) Applicant: Broadcom Corporation, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/145,350

(22) Filed: Dec. 31, 2013

(65) Prior Publication Data

US 2014/0111319 A1 Apr. 24, 2014

Related U.S. Application Data

(63) Continuation of application No. 13/302,937, filed on Nov. 22, 2011, now Pat. No. 8,624,728, which is a continuation of application No. 12/716,080, filed on Mar. 2, 2010, now Pat. No. 8,063,772, which is a continuation of application No. 11/456,455, filed on Jul. 10, 2006, now Pat. No. 7,671,735, which is a continuation of application No. 10/672,321, filed on Sep. 26, 2003, now Pat. No. 7,088,238.

(60) Provisional application No. 60/450,931, filed on Feb. 28, 2003, provisional application No. 60/432,472, filed on Dec. 11, 2002, provisional application No. 60/443,894, filed on Jan. 30, 2003.

(51) Int. Cl.
*G08B 1/08* (2006.01)
*G08C 19/00* (2006.01)
(Continued)

(52) U.S. Cl.
CPC ............ *G08C 19/00* (2013.01); *H04L 12/2803* (2013.01); *H04L 12/2818* (2013.01); *H04L 12/2834* (2013.01); *H04L 29/06027* (2013.01); *H04L 2012/2841* (2013.01); *H04L 2012/2845* (2013.01); *H04L 2012/2849* (2013.01); *H04L 2012/285* (2013.01); *H04N 5/4401* (2013.01); *H04N 7/141* (2013.01); *H04N 7/163* (2013.01); *H04N 7/17309* (2013.01); *H04N 7/17318* (2013.01); *H04N 7/17336* (2013.01); *H04N 7/18* (2013.01); *H04N 21/222* (2013.01); *H04N 21/23106* (2013.01); *H04N 21/2343* (2013.01); *H04N 21/234363* (2013.01); *H04N 21/2408* (2013.01); *H04N 21/254* (2013.01); *H04N 21/2541* (2013.01); *H04N 21/2543* (2013.01); *H04N 21/25435* (2013.01); *H04N 21/258* (2013.01); *H04N 21/25808* (2013.01);
(Continued)

(58) Field of Classification Search
USPC ......... 340/12.22, 539.14, 3.1, 12.31; 348/734
See application file for complete search history.

(56) References Cited

U.S. PATENT DOCUMENTS 5,706,191 A * 1/1998 Bassett et al. ..................... 700/9
5,822,012 A * 10/1998 Jeon et al. ..................... 348/553

(Continued)

*Primary Examiner* — Eric M Blount
(74) *Attorney, Agent, or Firm* — Garlick & Markison; Bruce E. Garlick

(57) ABSTRACT

A device and method for accessing, monitoring, and controlling home appliances in a media exchange network by establishing a communication link between a communication initiation device and at least one home appliance and communicating at least one command from the communication initiation device to the at least one home appliance via the communication link. The at least one home appliance then generates at least one response to the at least one command. The commands may include turning the home appliance(s) on and off, parameter adjustment commands, access commands, monitoring commands, mode change commands, and programming commands. Appliance responses may include powering on, powering off, changing a mode of operation, sending a status to the communication initiation device, adjusting an operational parameter, and changing a programmed operational step.

20 Claims, 13 Drawing Sheets

(51) Int. Cl.
| | |
|---|---|
| H04L 12/28 | (2006.01) |
| H04L 29/06 | (2006.01) |
| H04N 7/14 | (2006.01) |
| H04N 7/16 | (2011.01) |
| H04N 7/173 | (2011.01) |
| H04N 7/18 | (2006.01) |
| H04N 21/222 | (2011.01) |
| H04N 21/231 | (2011.01) |
| H04N 21/2343 | (2011.01) |
| H04N 21/24 | (2011.01) |
| H04N 21/254 | (2011.01) |
| H04N 21/2543 | (2011.01) |
| H04N 21/258 | (2011.01) |
| H04N 21/262 | (2011.01) |
| H04N 21/2668 | (2011.01) |
| H04N 21/2743 | (2011.01) |
| H04N 21/2747 | (2011.01) |
| H04N 21/41 | (2011.01) |
| H04N 21/414 | (2011.01) |
| H04N 21/4143 | (2011.01) |
| H04N 21/418 | (2011.01) |
| H04N 21/422 | (2011.01) |
| H04N 21/4223 | (2011.01) |
| H04N 21/4227 | (2011.01) |
| H04N 21/426 | (2011.01) |
| H04N 21/431 | (2011.01) |
| H04N 21/432 | (2011.01) |
| H04N 21/433 | (2011.01) |
| H04N 21/436 | (2011.01) |
| H04N 21/4363 | (2011.01) |
| H04N 21/4402 | (2011.01) |
| H04N 21/442 | (2011.01) |
| H04N 21/45 | (2011.01) |
| H04N 21/458 | (2011.01) |
| H04N 21/462 | (2011.01) |
| H04N 21/4627 | (2011.01) |
| H04N 21/466 | (2011.01) |
| H04N 21/472 | (2011.01) |
| H04N 21/475 | (2011.01) |
| H04N 21/4782 | (2011.01) |
| H04N 21/4786 | (2011.01) |
| H04N 21/4788 | (2011.01) |
| H04N 21/482 | (2011.01) |
| H04N 21/485 | (2011.01) |
| H04N 21/488 | (2011.01) |
| H04N 21/61 | (2011.01) |
| H04N 21/63 | (2011.01) |
| H04N 21/637 | (2011.01) |
| H04N 21/6402 | (2011.01) |
| H04N 21/643 | (2011.01) |
| H04N 21/658 | (2011.01) |
| H04N 21/6583 | (2011.01) |
| H04N 21/6587 | (2011.01) |
| H04N 21/81 | (2011.01) |
| H04N 21/84 | (2011.01) |
| H04L 29/08 | (2006.01) |
| H04N 5/44 | (2011.01) |
| H04N 21/47 | (2011.01) |

(52) U.S. Cl.
CPC ... *H04N21/25816* (2013.01); *H04N 21/25833* (2013.01); *H04N 21/25875* (2013.01); *H04N 21/25891* (2013.01); *H04N 21/26266* (2013.01); *H04N 21/2668* (2013.01); *H04N 21/2743* (2013.01); *H04N 21/2747* (2013.01); *H04N 21/4126* (2013.01); *H04N 21/4131* (2013.01); *H04N 21/4135* (2013.01); *H04N 21/41407* (2013.01); *H04N 21/41422* (2013.01); *H04N 21/4143* (2013.01); *H04N 21/4182* (2013.01); *H04N 21/422* (2013.01); *H04N 21/42204* (2013.01); *H04N 21/4223* (2013.01); *H04N 21/4227* (2013.01); *H04N 21/42684* (2013.01); *H04N 21/4312* (2013.01); *H04N 21/4314* (2013.01); *H04N 21/4316* (2013.01); *H04N 21/4325* (2013.01); *H04N 21/4331* (2013.01); *H04N 21/4334* (2013.01); *H04N 21/436* (2013.01); *H04N 21/43615* (2013.01); *H04N 21/43632* (2013.01); *H04N 21/43637* (2013.01); *H04N 21/440281* (2013.01); *H04N 21/442* (2013.01); *H04N 21/44222* (2013.01); *H04N 21/4532* (2013.01); *H04N 21/458* (2013.01); *H04N 21/4622* (2013.01); *H04N 21/4627* (2013.01); *H04N 21/4668* (2013.01); *H04N 21/47* (2013.01); *H04N 21/47202* (2013.01); *H04N 21/47214* (2013.01); *H04N 21/4751* (2013.01); *H04N 21/4753* (2013.01); *H04N 21/4755* (2013.01); *H04N 21/4758* (2013.01); *H04N 21/4782* (2013.01); *H04N 21/4786* (2013.01); *H04N 21/4788* (2013.01); *H04N 21/482* (2013.01); *H04N 21/4821* (2013.01); *H04N 21/4826* (2013.01); *H04N 21/4828* (2013.01); *H04N 21/4856* (2013.01); *H04N 21/4882* (2013.01); *H04N 21/6125* (2013.01); *H04N 21/6143* (2013.01); *H04N 21/6187* (2013.01); *H04N 21/632* (2013.01); *H04N 21/637* (2013.01); *H04N 21/6402* (2013.01); *H04N 21/64322* (2013.01); *H04N 21/6581* (2013.01); *H04N 21/6582* (2013.01); *H04N 21/6583* (2013.01); *H04N 21/6587* (2013.01); *H04N 21/8113* (2013.01); *H04N 21/812* (2013.01); *H04N 21/814* (2013.01); *H04N 21/8146* (2013.01); *H04N 21/84* (2013.01); *H04L 65/80* (2013.01); *H04L 67/06* (2013.01); *H04L 67/306* (2013.01); *H04L 67/325* (2013.01); *H04L 67/327* (2013.01)

(56) References Cited

U.S. PATENT DOCUMENTS

| | | | | |
|---|---|---|---|---|
| 5,839,097 | A * | 11/1998 | Klausner | 340/12.3 |
| 6,480,586 | B1 * | 11/2002 | Hayes et al. | 379/102.02 |
| 6,510,212 | B2 * | 1/2003 | Ito et al. | 379/102.03 |
| 7,006,881 | B1 * | 2/2006 | Hoffberg et al. | 700/83 |
| 2002/0035404 | A1 * | 3/2002 | Ficco et al. | 700/65 |
| 2002/0063633 | A1 * | 5/2002 | Park | 340/825.69 |
| 2002/0103898 | A1 * | 8/2002 | Moyer et al. | 709/224 |
| 2003/0097452 | A1 * | 5/2003 | Kim et al. | 709/229 |
| 2004/0025179 | A1 * | 2/2004 | Russ et al. | 725/46 |
| 2010/0313169 | A1 * | 12/2010 | Huang et al. | 715/835 |
| 2011/0285852 | A1 * | 11/2011 | Thomas et al. | 348/159 |

* cited by examiner

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | | | Normal Estimated Delivery Time: 2 hrs 13 min Cost: 59c (without Queuing) | Showing All Day (48 Min), Earliest Order Time: 4:00PM MPEG-2 1.5 Mbps | |
| VACATION in ALASKA VIDEO 803 | | | Express Estimated Delivery Time: 18 min Cost: $1.2 (with Queuing) | Showing All Day (48 Min), Earliest Order Time: 4:00PM MPEG-2 4 Mbps | |
| VACATION in ALASKA VIDEO 804 | | | Overnight Delivery: Avail. Nxt Morning Cost: 5c (Server Stored) | Showing All Day (48 Min), Earliest Order Time: 4:00PM MPEG-2 19 Mbps | |

ACCESS, MONITORING, AND CONTROL OF APPLIANCES VIA A MEDIA PROCESSING SYSTEM

CROSS-REFERENCE TO RELATED APPLICATIONS

The present U.S. Utility Patent Application claims priority pursuant to 35 U.S.C. §120, as a continuation of U.S. Utility patent application Ser. No. 13/302,937, filed Nov. 22, 2011, issuing as U.S. Pat. No. 8,624,728, which is incorporated herein by reference in its entirety for all purposes.

The Ser. No. 13/302,937 Application claims priority pursuant to 35 U.S.C. §120, as a continuation of U.S. Utility patent application Ser No. 12/716,080, filed Mar. 2, 2010, now U.S. Pat. No. 8,063,772, which is incorporated herein by reference in its entirety for all purposes.

The Ser. No. 12/716,080 Application claims priority pursuant to 35 U.S.C. §120, as a continuation of U.S. Utility patent application Ser. No. 11/456,455, filed Jul. 10, 2006, now U.S. Pat. No. 7,671,735, which is incorporated herein by reference in its entirety for all purposes.

The Ser. No. 11/456,455 Application claims priority pursuant to 35 U.S.C. §120, as a continuation of U.S. Utility patent application Ser. No. 10/672,321, filed Sep. 26, 2003, now U.S. Pat. No. 7,088,238, which is incorporated herein by reference in its entirety for all purposes.

The Ser. No. 10/672,321 Application claims priority pursuant to 35 U.S.C. §119(e) to U.S. Provisional Patent Applications No. 60/450,931, filed Feb. 28, 2003; 60/443,894, filed Jan. 30, 2003; and No. 60/432,472, filed Dec. 11, 2002, which are all incorporated herein by reference in their entirety for all purposes.

In addition, this application makes reference to U.S. patent application Ser. No. 10/657,390, entitled "Personal Inter-Home Media Exchange Network", filed Sep. 8, 2003; and U.S. patent application Ser. No. 10/660,267, entitled "Personal Access And Control Of Media Peripherals On A Media Exchange Network", filed Sep. 11, 2003, the complete subject matter of both applications are incorporated herein by reference in their entirety.

BACKGROUND OF THE INVENTION

Today, home appliances often have status indicators such as timers, buzzers, lights, and beepers to indicate their status. For example, an oven may have a timer that beeps when the set time is up, indicating that whatever is baking in the oven should be done. A buzzer may go off on a washing machine when a load of laundry is finished washing. A red LED may stay on while a dish washer is still operating. These status indicators are typically only effective in conveying status information to a user if the user is in the vicinity of the appliance. Home appliances are continuously becoming more sophisticated. For example, the ability to connect appliances to a computer-based network is beginning to come about in the industry.

Currently, TV (television) sets are used simply to consume programming information such as audio and video. TV sets typically receive programming information via cable, satellite, or direct RF broadcast. The TV set performs standard TV broadcast channel processing and displays the associated program. A TV set is not typically interfaced to a computer-based network.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

A device and/or method for accessing, monitoring, and controlling appliances via a media processing system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a media guide user interface showing several options of a pushed media in accordance with an embodiment of the present invention.

DETAILED DESCRIPTION OF THE INVENTION

Figure 1:
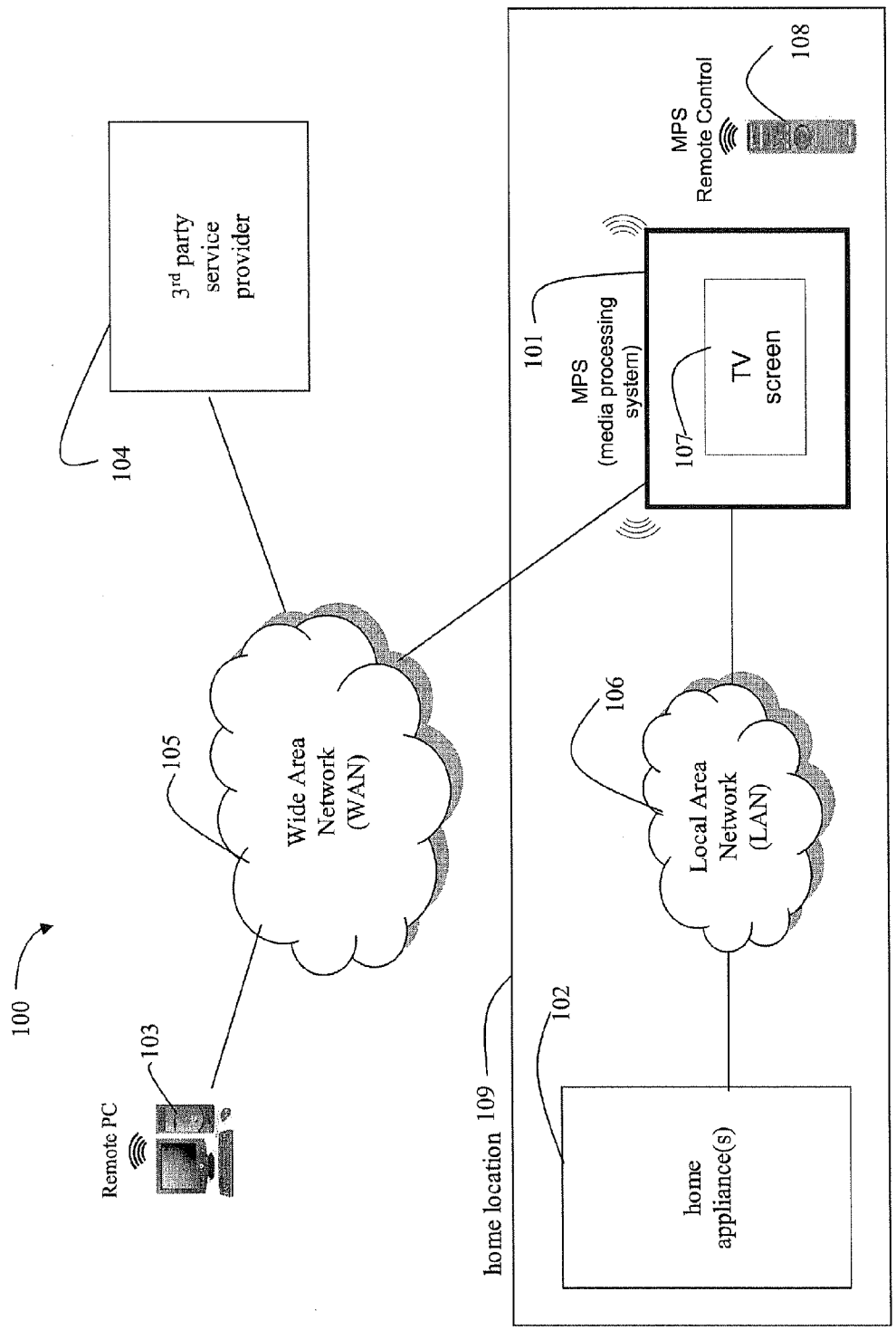
FIG. 1 is a diagram illustrating an embodiment of a media exchange network supporting access, monitoring, and control of home appliances, in accordance with various aspects of the present invention.

FIG. 1 is a diagram illustrating an embodiment of a media exchange network 100 supporting access, monitoring, and control of home appliances, in accordance with various aspects of the present invention. Specifically, a media exchange network 100 is a communication network comprising a MPS (media processing system) 101 located in a home location 109 of the media exchange network 100, a home appliance(s) 102 located in the home location 109, a remote PC 103 at a remote location, a 3$^{rd}$ party service provider 104, a WAN (Wide Area Network) 105, and a LAN (Local Area Network) 106. The MPS 101 may interface wirelessly or via a wired connection to both the LAN 106 and the WAN 105. The remote location may be, for example, a user's second home, a friend's home, or a family member's home. The remote PC 103 may comprise a desktop PC, a notebook PC, a PDA, or any computing device.

In accordance with various embodiments of the present invention, a MPS may comprise a set-top-box (STB), a PC, or a TV with a media management system (MMS). A MMS is also known herein as a media exchange software (MES) platform. A MPS includes at least one media peripheral (such as a TV screen, a PC monitor, a media player, some other display device) and a broadband communication interface to allow interfacing to a wide area network (WAN), in accordance with an embodiment of the present invention. The MPS may also include a remote control user interface to allow for controlling functionality of the MMS of the MPS, in accordance with an embodiment of the present invention.

A MMS comprises a software platform operating on at least one processor to provide certain functionality including user interface functionality, distributed storage functionality, and networking functionality. For example, a MMS may provide control of home appliances, status monitoring of home appliances, and inter-home MPS routing selection, in accordance with an embodiment of the present invention. An MPS is also known, herein, as a media-box and/or an M-box.

The remote PC 103, the MPS 101, and the 3$^{rd}$ party service provider 104 each interface to the WAN 105. The home appliance(s) 102 interfaces to the MPS 101 via the LAN 106.

The LAN 106 may comprise, for example, a home cable infrastructure, an Ethernet infrastructure, an 802.11b wireless infrastructure, or a home PNA (phoneline networking alliance) infrastructure, providing local networking capability within the home location 109.

The WAN 105 may include cable infrastructure, DSL infrastructure, Internet infrastructure, broadband access headends (e.g., cable headends, satellite headends), or intranet infrastructure in order to provide communications between, for example, the MPS 101, the remote PC 103, and the 3$^{rd}$ party service provider 104.

The MPS 101 comprises a TV screen 107 (i.e., media peripheral) for selection and viewing of media content and for access, monitoring, and control of the home appliance(s) 102. The media exchange network 100 further comprises a remote control 108 (i.e., a user control device) that a user may employ to control the functionality of the MPS 101. Other user control devices may include a keyboard and a mouse connected to a PC, for example.

The home appliance(s) 102 may comprise a dishwasher, a refrigerator, a microwave oven, a clothes washer, a clothes dryer, a hot water heater, a heating system, an air conditioning system, or any other type of home appliance that is capable of being networked to the LAN 106.

In accordance with an embodiment of the present invention, the MPS 101 may indirectly access, monitor, and control the home appliance(s) 102 via the LAN 106 with the remote control 108 interacting with the TV screen 107. The remote PC 103 may indirectly access, monitor, and control the home appliance(s) 102. Such access, monitoring, and control may be accomplished in a communication pathway via the WAN 105 and MPS 101. Similarly, the 3$^{rd}$ party service provider 104 may also indirectly access, monitor, and control the home appliance(s) 102 via the WAN 105 and MPS 101.

Today, TV is typically only used for media consumption, not to control home appliances without performing media consumption, for example. An MPS may or may not be the beneficiary or initiator of home appliance control, monitoring, and access. For example, the 3$^{rd}$ party service provider 104 may carry out access, monitoring, and control of a home appliance(s) 102 via the MPS 101 without information consumption or user interaction. In such a case, the MPS 101 is not going to receive or use information directly.

There are many types of indirect control commands available to manipulate the home appliance(s) 102. Each home appliance may have particular indirect commands unique to that appliance or type of appliance. Many of the indirect commands find parallels to the available direct commands. Exemplary commands include turning the home appliance(s) 102 on and off, parameter adjustment commands, access commands, monitoring commands, mode change commands, and programming commands.

The home appliance(s) 102 may be controlled from the TV screen 107, the remote PC 103, or the 3$^{rd}$ party service provider 104 via user interaction, or automatically, in accordance with various embodiments of the present invention.

Figure 2A:
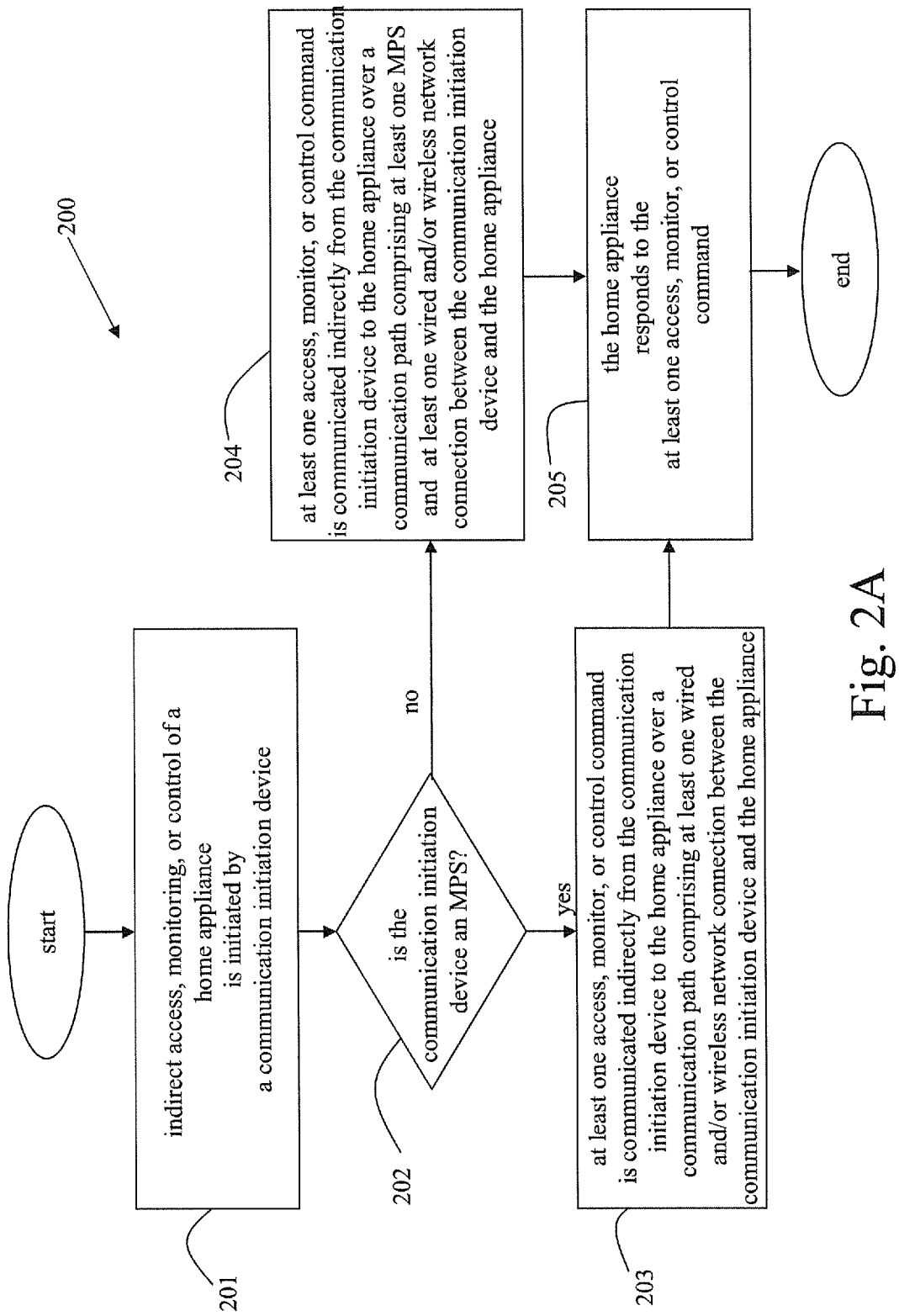
FIG. 2A is a flowchart illustrating an embodiment of a first method, using the media exchange network of FIG. 1, for indirectly accessing, monitoring, or controlling a home appliance, in accordance with various aspects of the present invention.

FIG. 2A is a flowchart illustrating an embodiment of a first method 200, using the media exchange network 100 of FIG. 1, for indirectly accessing, monitoring, or controlling a home appliance, in accordance with certain aspects of the present invention. In step 201, indirect access, monitoring, or control of a home appliance is initiated by a communication initiation device. The communication initiation device may comprise, for example, a MPS, a PC, or a third party system. The home appliance may comprise, for example, a clothes washer, a clothes dryer, a refrigerator, a microwave oven, or a dish washer.

In step 202, a decision is made based on whether or not the communication initiation device is a MPS or not. If the communication initiation device is a MPS, then the method 200 proceeds to step 203, else the method 200 proceeds to step 204.

In step 203, at least one access, monitor, or control command is communicated indirectly from the communication initiation device to the home appliance over a communication path (link) comprising at least one wired and/or wireless network connection between the communication initiation device and the home appliance. The at least one wired and/or wireless network connection may comprise at least one local area network and/or at least one wide area network, or any combination thereof.

In step 204, at least one access, monitor, or control command is communicated indirectly from the communication initiation device to the home appliance over a communication path (link) comprising at least one MPS and at least one wired and/or wireless network connection between the communication initiation device and the home appliance. The at least one wired and/or wireless network connection may comprise at least one local area network and/or at least one wide area network, or any combination thereof. In step 205, the home appliance responds to the at least one access, monitor, or control command.

As defined herein, a communication initiation device may include a MPS, a PC, or a 3$^{rd}$ party service provider.

Figure 2B:
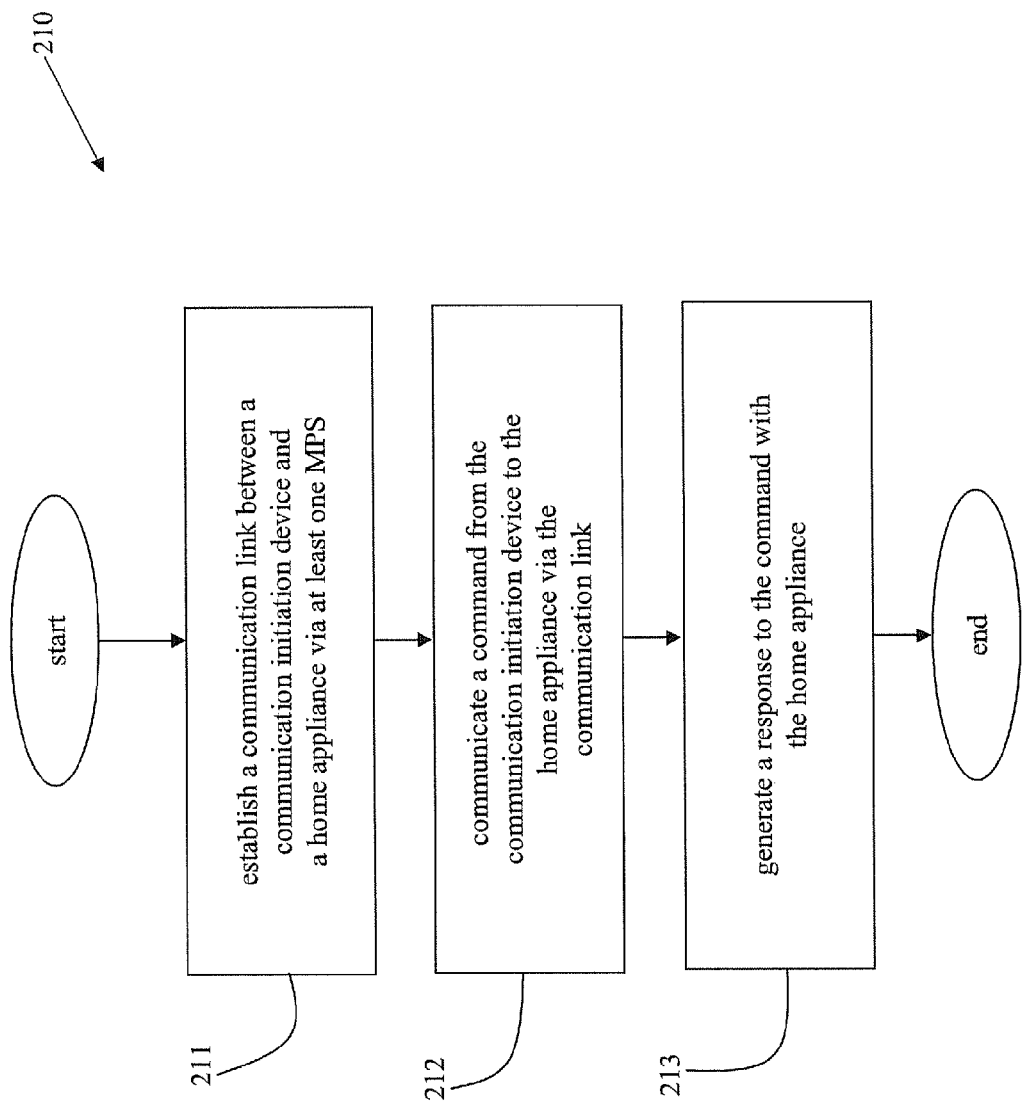
FIG. 2B is a flowchart illustrating an embodiment of a second method, using the media exchange network of FIG. 1, for indirectly accessing, monitoring, and controlling a home appliance, in accordance with various aspects of the present invention.

FIG. 2B is a flowchart illustrating an embodiment of a second method 210, using the media exchange network of FIG. 1, for indirectly accessing, monitoring, and controlling a home appliance, in accordance with various aspects of the present invention. In step 211, a communication link is established between a communication initiation device and a home appliance. In step 212, a command is communicated from the communication initiation device to the home appliance via the communication link. In step 213, the home appliance generates a response to the command.

In accordance with an embodiment of the present invention, various home appliance responses may include powering on, powering off, changing a mode of operation (e.g., heat, cool, wash, dry, rinse, etc.), sending a status (e.g., temperature) to the communication initiation device, adjusting an operational parameter (e.g., water temperature, oven temperature, etc.), and changing a programmed operational step (e.g., wash, dry, rinse, etc.).

As an example, a user of the MPS 101 may be washing clothes in the home appliance 102 which comprises a clothes washer. The home appliance 102 is connected to the MPS 101 via the LAN 106. The user of the MPS 101 may send a command to the home appliance 102 in order to monitor the status of the home appliance 102. The home appliance 102 may respond by sending status information to the MPS 101. For example, when the load of clothes are finished washing, the home appliance 102 sends a "laundry done" response to the MPS 101. The response may appear on the TV screen 107 of the MPS 101 to alert the user. As a result, the user knows to go put the washed clothes in the clothes dryer, for example.

As another example, the user of the MPS 101 may go on vacation. The user signs up with the 3$^{rd}$ party service provider 104 to monitor and control the home appliance 102, which is an air conditioning unit, while the user is on vacation. The air conditioning unit is networked to the MPS 101 via the LAN 106.

The 3$^{rd}$ party service provider 104 may send a command to the home appliance 102 via the WAN 105, the MPS 101, and the LAN 106 in order to monitor the on/off status of the home appliance 102. The home appliance 102 may respond by sending status information corresponding to its on/off state over the media exchange network 100 to the 3$^{rd}$ party service provider 104.

When the user gets back from vacation, the 3$^{rd}$ party service provider 104 may provide the user with a report of the percentage of time the home appliance 102 (i.e., air conditioning unit) was on versus off during the user's vacation. The user may use this information to set the temperature in his home 109 the next time he goes on vacation.

As yet another example, the user of the MPS 101 may be at work at a location remote from his home 109. The user has access to the PC 103 at the remote location. While working on the PC 103, the user remembers that he wants to turn on the home appliance 102, which is an oven, at 5:00 pm in order to bake some potatoes that he previously placed in the oven before he left for work. As a result, the user uses the PC 103 to command the home appliance 102 to turn on and be set to a baking temperature of 350 degrees. The command is sent to the home appliance 102 via the WAN 105, the MPS 101, and the LAN 106. The oven responds by turning on and heating to 350 degrees. When the user gets home at 5:45 pm, the potatoes are done baking.

Other examples may include a 3$^{rd}$ party service provider 104 checking on whether or not a home appliance 102 has the latest software upgrade or a 3$^{rd}$ party service provider 104 performing a test of a home appliance 102, in accordance with various embodiments of the present invention.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
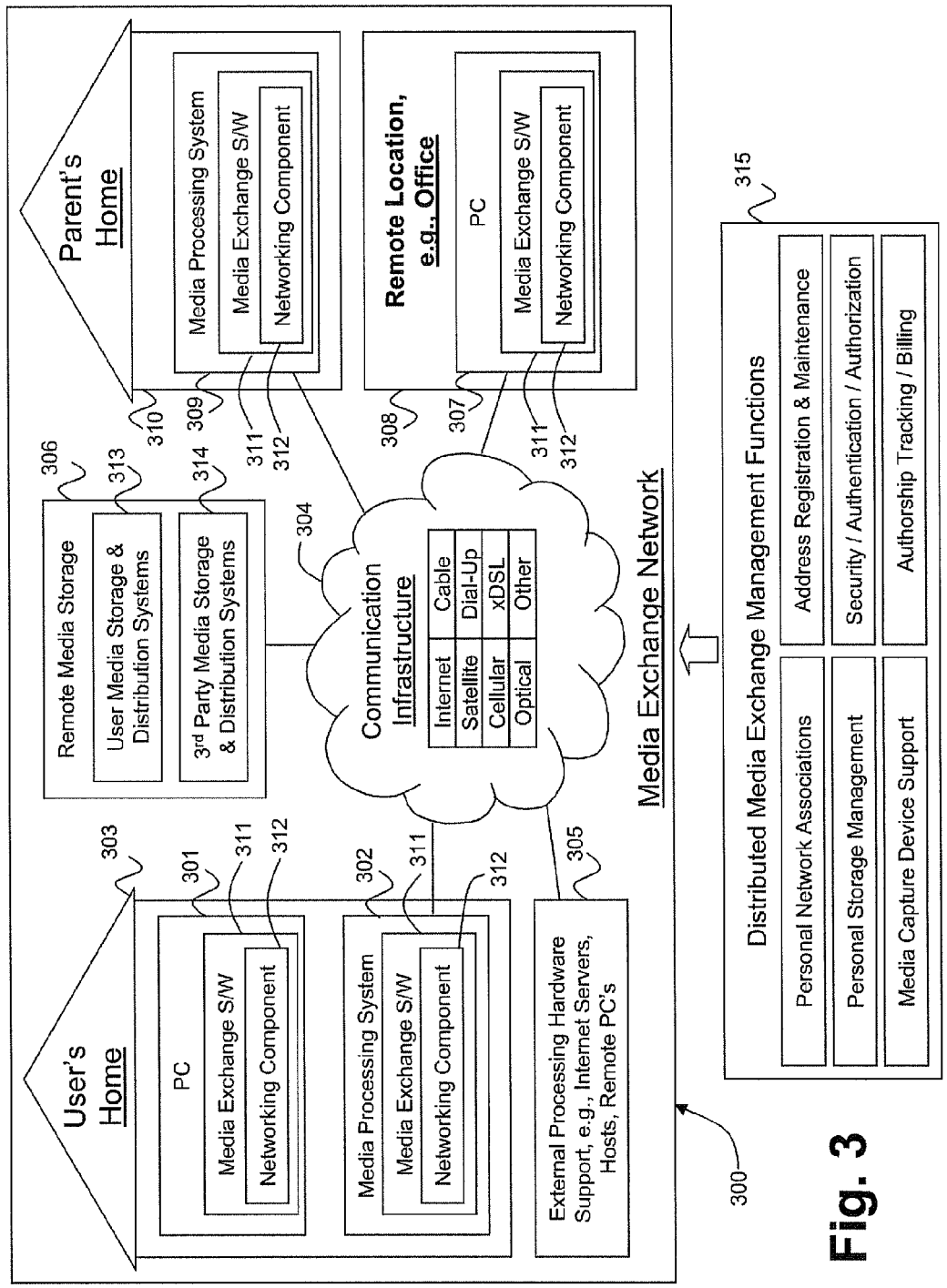
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
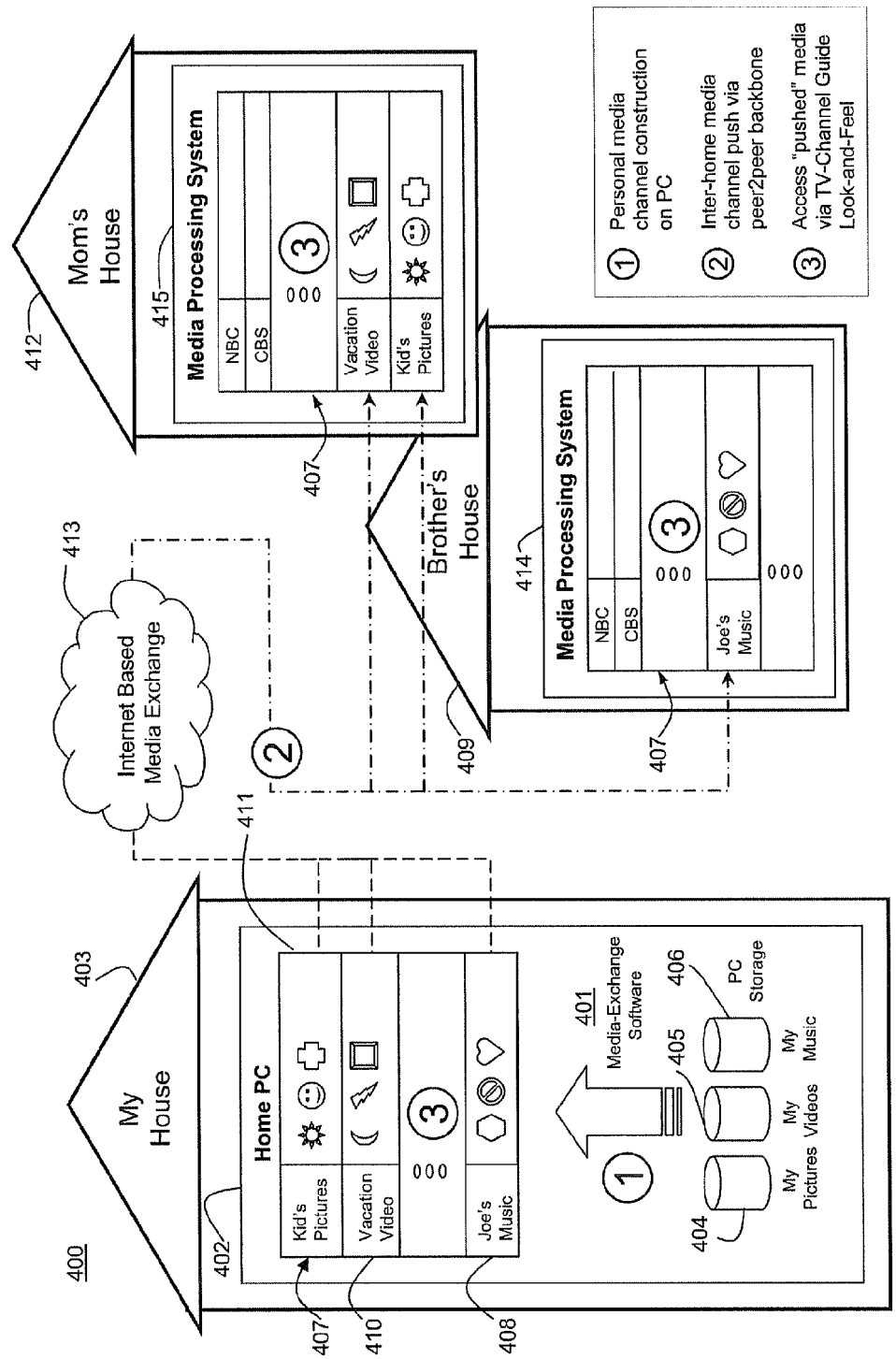
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
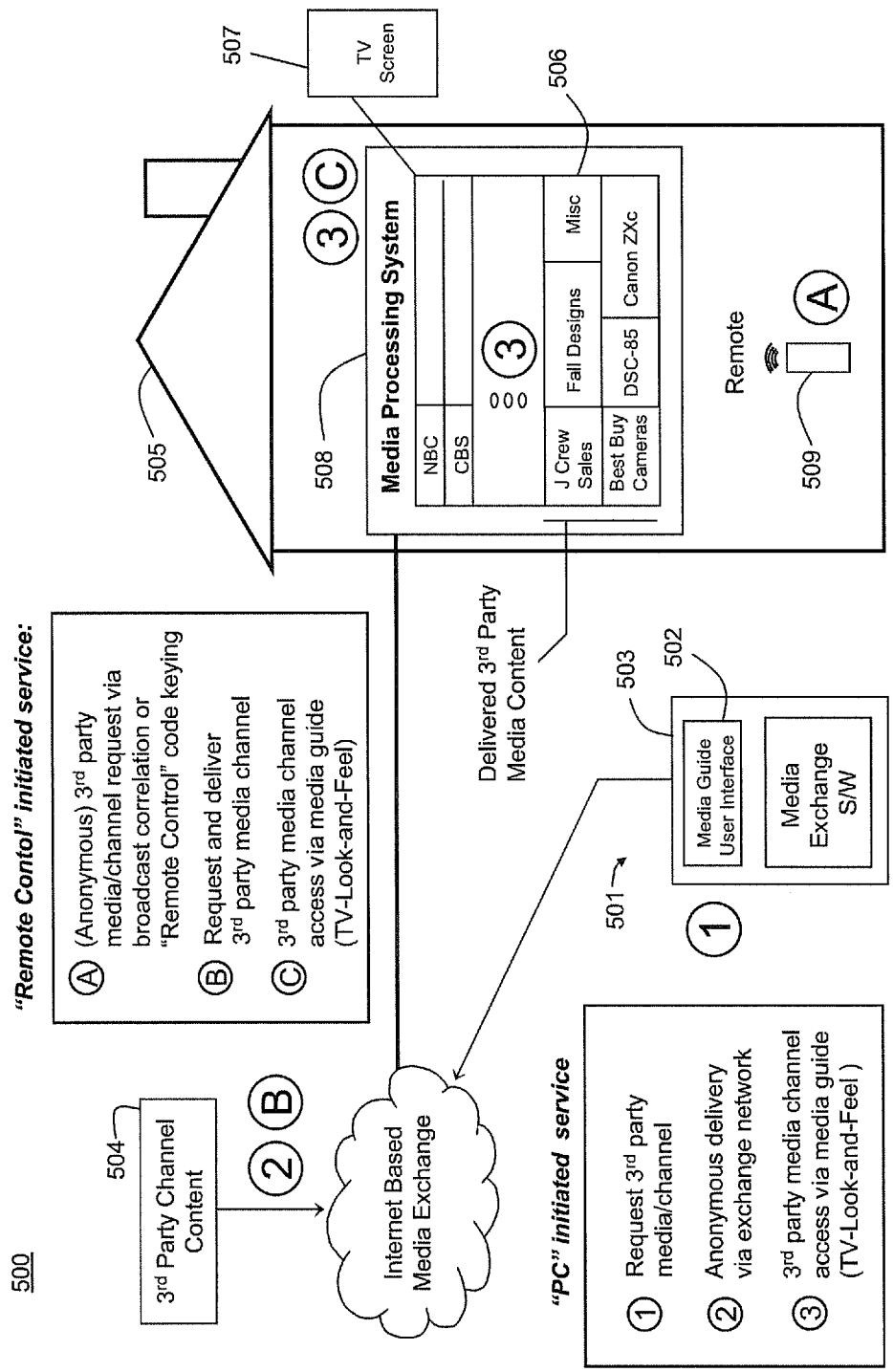
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
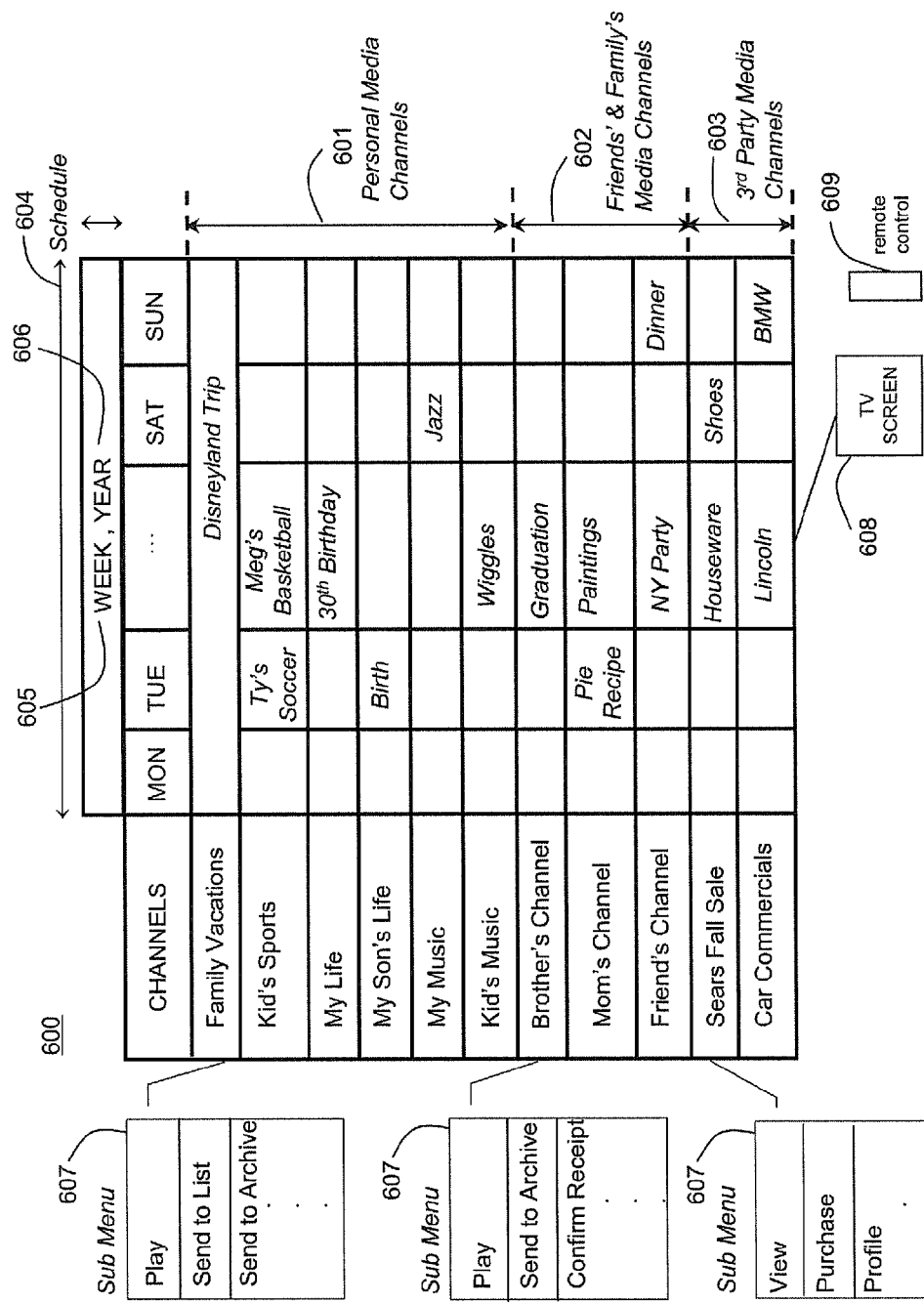
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
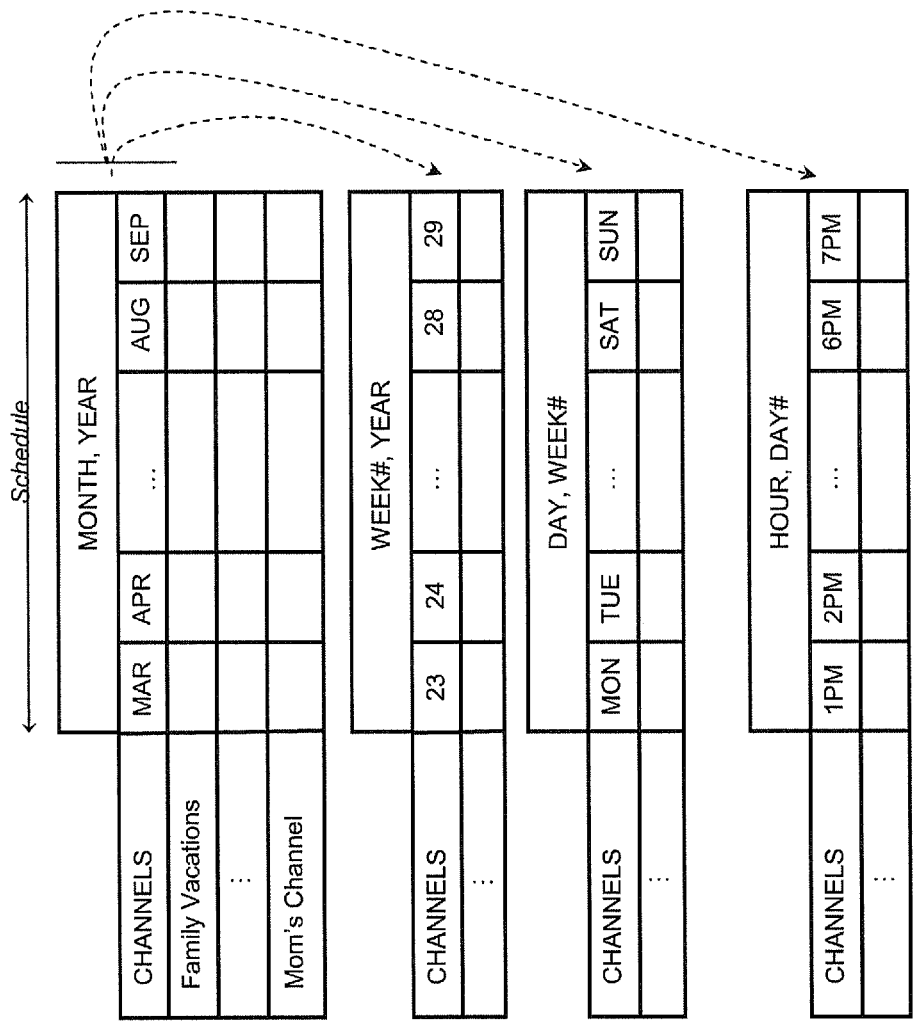
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
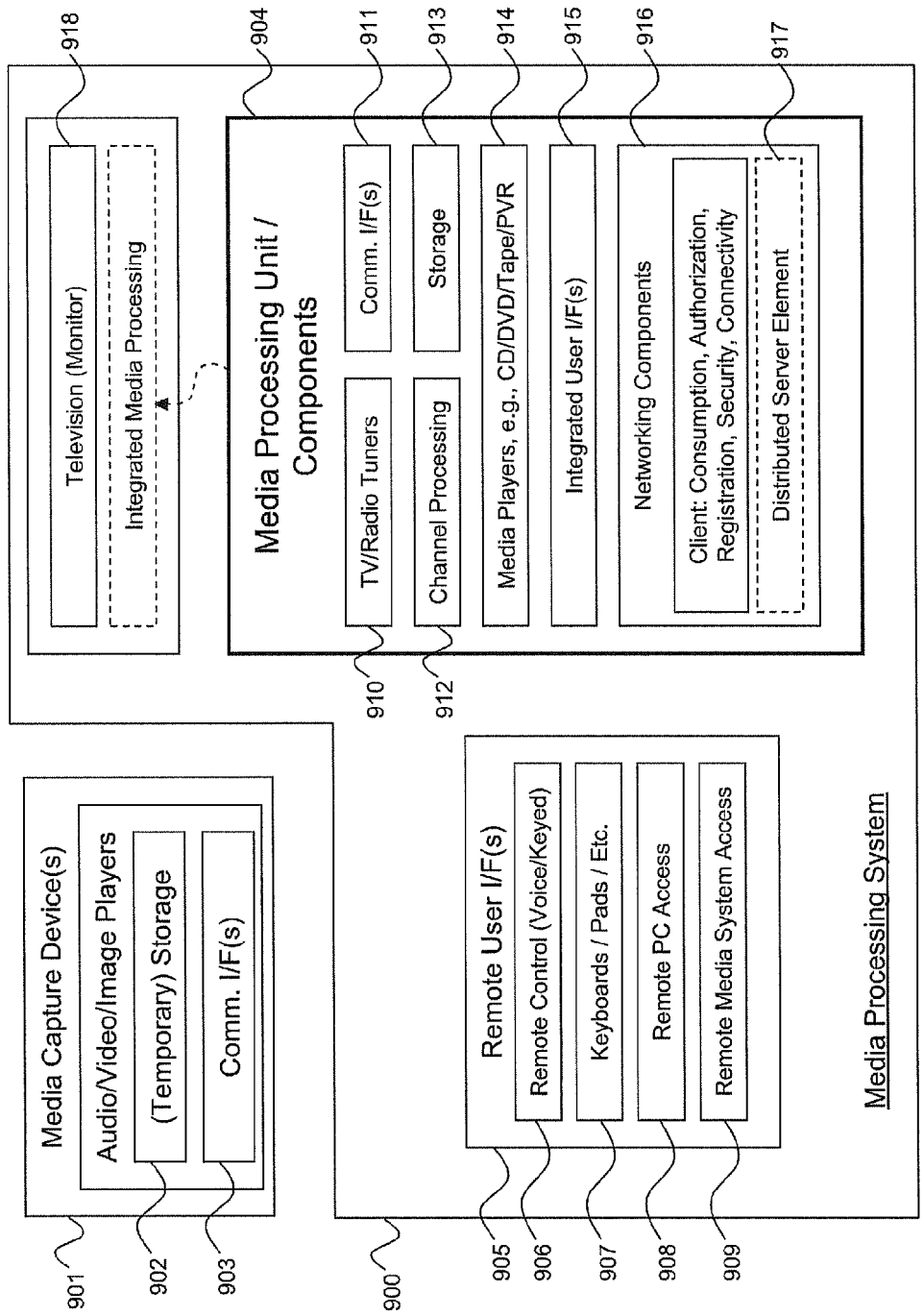
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
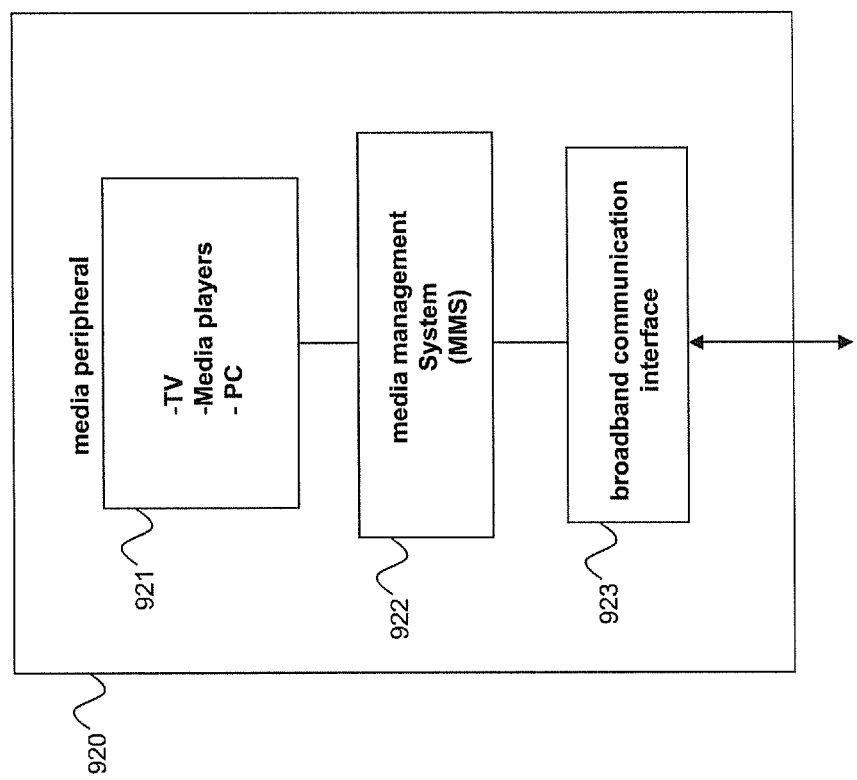
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
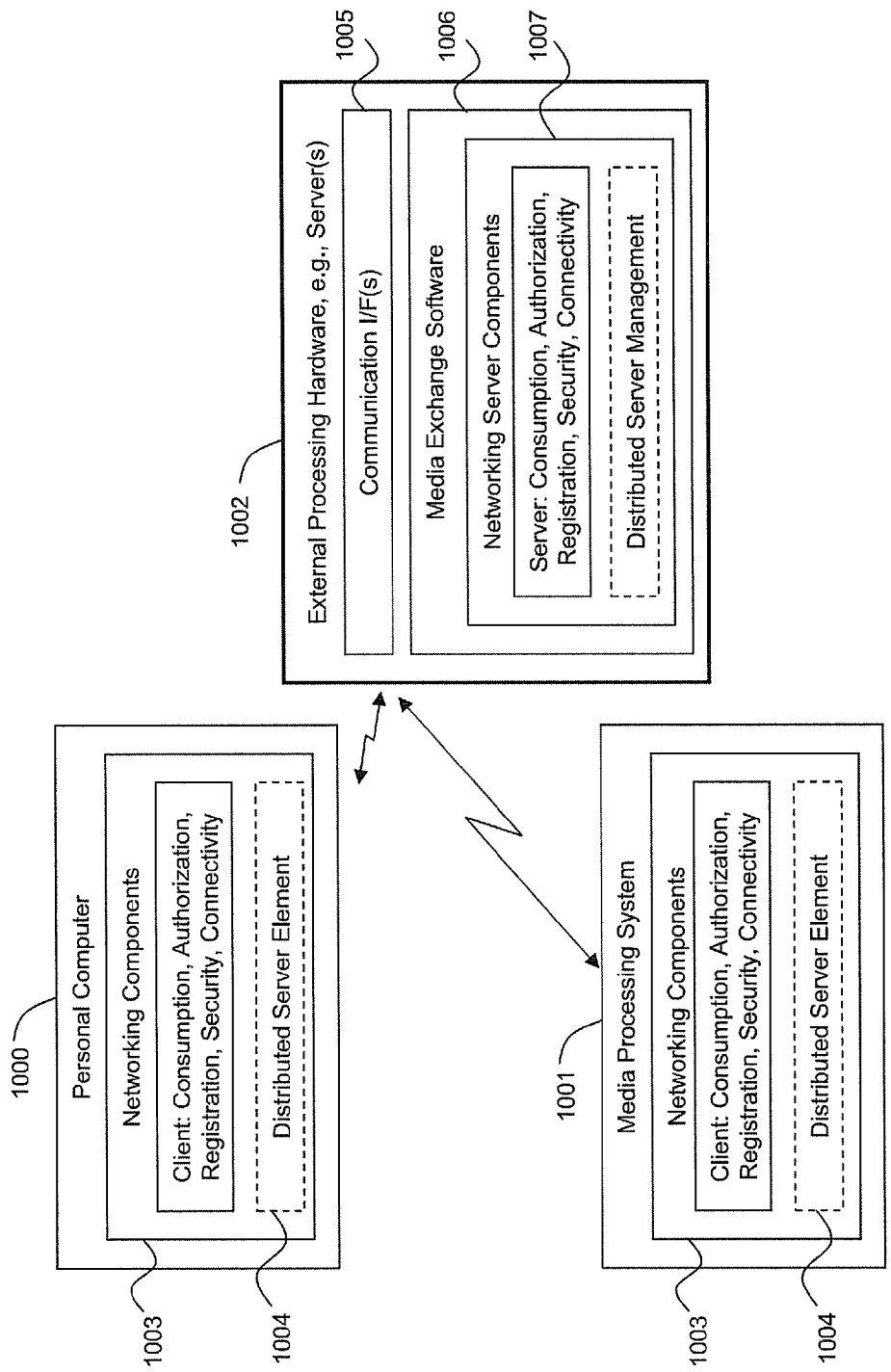
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
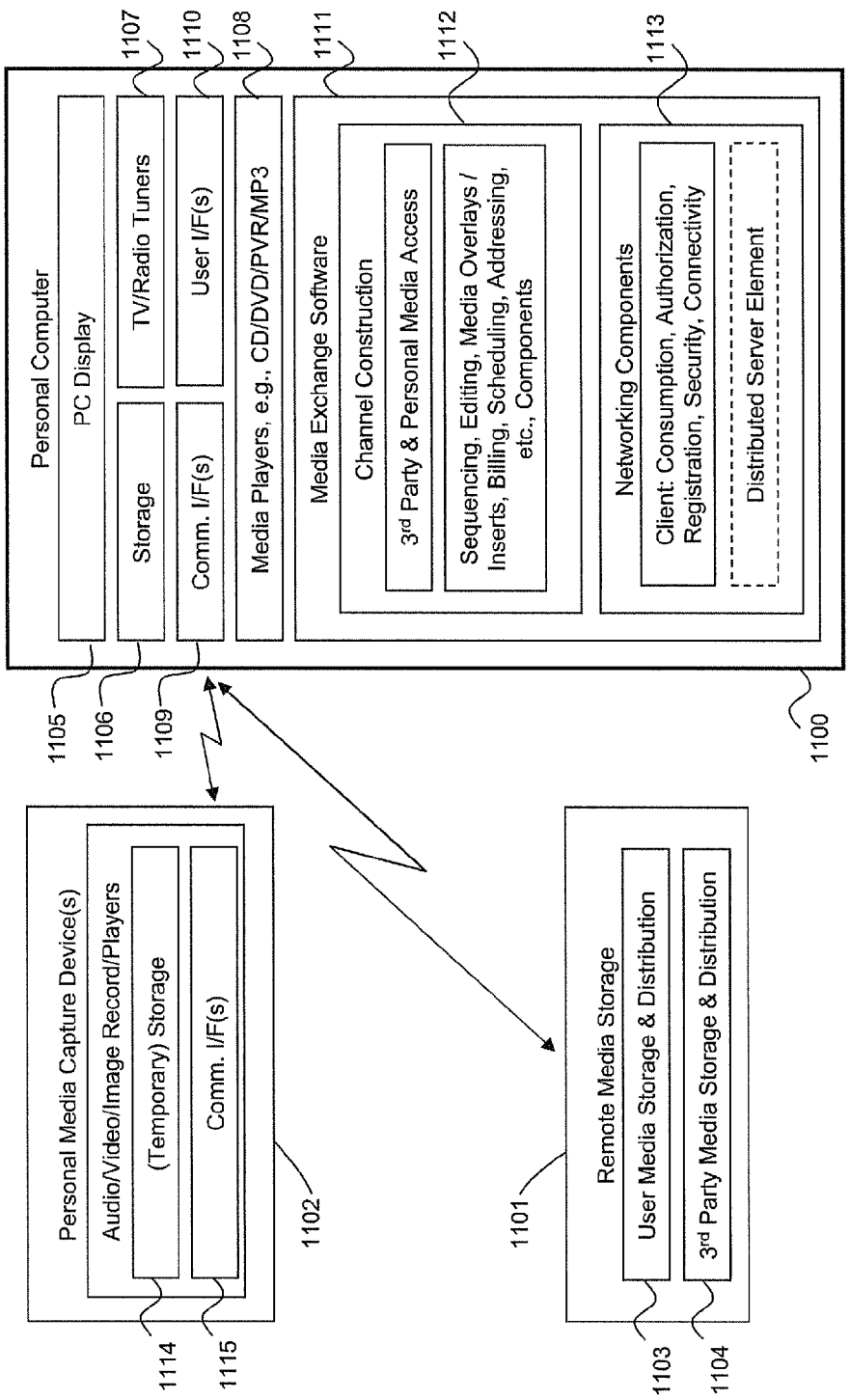
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Aspects of the present invention may be found in a system supporting access, monitoring, and control of appliances. Such an embodiment of the present invention may comprise a set top box at a first location, at least one home appliance at the first location, and a local area network operationally coupling the set top box to the at least one home appliance, via a wired or wireless connection, to allow access, monitoring, and control of the at least one home appliance. In addition, an embodiment of the present invention may comprise a personal computer at a remote second location, a server at a remote third location, and a wide area network operationally coupling the set top box, the personal computer, and the server via wired and/or wireless connections. The wide area network may comprise at least one broadband access headend, and an Internet infrastructure operationally coupling to the at least one broadband access headend. The at least one broadband access headend may comprise a cable headend, and a satellite headend, and the server may be operated by a third party service provider.

In an embodiment of the present invention, the set top box may comprise a broadband communication interface, and software supporting communication between at least one media peripheral and the broadband communication interface. The at least one media peripheral may comprise at least one of a television, a personal computer, and a media player, and the at least one media peripheral may comprise at least one display device. The at least one home appliance may comprise at least one of a dish washer, a refrigerator, a microwave oven, a clothes washer, and a clothes dryer. The at least one home appliance may also comprise a heating system, an air conditioning system, a hot water heater, and may comprise any device that is capable of being networked to the local area network.

An embodiment in accordance in accordance with the present invention may comprise a remote control, at the first location, communicatively coupled to control the set top box. The local area network may comprise at least one of a home cable infrastructure, an Ethernet infrastructure, an 802.11b wireless infrastructure, or a home PNA (phoneline networking alliance) infrastructure.

Additional aspects of the present invention may be observed in a method of providing access, monitoring, and control of appliances via a communication network. Such a method may comprise identifying by a first system, at a first location, at least one home appliance communicatively coupled to at least one of the first system and a second system, the second system at a second location. The method may also comprise establishing a communication link between the first system and the at least one home appliance via the communication network. An embodiment of the present invention may comprise verifying authorization for control of the at least one home appliance by the first system, and communicating, from the first system, at least one command to the at least one home appliance via the communication network, if the verifying is successful. An embodiment of the present invention may comprise refraining from communicating at least one command to the at least one home appliance via the communication network, if the verifying is not successful. In addition, an embodiment of the present invention may comprise receiving, at the first system, at least one response from the at least one home appliance, if a command was communicated.

In various embodiments, at least one of the first system and the second system may comprise a set top box, a personal computer, and a server. The server may be operated by a third party service provider. The at least one home appliance may comprise at least one of a dish washer, a refrigerator, a microwave oven, a clothes washer, and a clothes dryer. The at least one home appliance may also comprise at least one of a heating system, an air conditioning system, and a hot water heater, and may comprise any device that is capable of being networked to at least one of the first system and the second system. The communication link may be via at least one wired connection, and the communication link may be via at least one wireless connection. At least one portion of the communication link may be via a cable infrastructure, and may be via a plurality of wired and/or wireless connections.

In various embodiments of the present invention, the at least one command may comprise at least one of an access command, a power on command, a power off command, a parameter adjustment command, a mode change command, a parameter monitor command, and a programming command. The at least one response may comprise at least one of the at least one appliance powering on, the at least one appliance powering off, the at least one appliance changing a mode of operation. The at least one response may also comprise the at least one appliance sending a status to the first system, the at least one appliance adjusting an operational parameter, and the at least one appliance changing at least one programmed operational step.

Various embodiment of the present invention include a system and method that provide for accessing, monitoring, and controlling home appliances via a media processing system. The home appliances may be connected to the media processing system through a local area network. Remote PC's and $3^{rd}$ party service providers may access, monitor, and control the home appliances via the media processing system over a wide area network, or the media processing system may access, monitor, and control the home appliances over the local area network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of controlling an appliance using a media processing system, comprising:
   utilizing a media processing system, which has media management capability to exchange media content among a plurality of devices selected to form a media exchange network for exchanging the media content within a closed and secure network environment formed by the media exchange network, to identify an appliance for inclusion into the media exchange network;
   configuring the media processing system to link to the appliance; and
   enabling a communication with the appliance to access the appliance.

2. The method of claim 1, wherein when enabling communications to access the appliance, the media processing system receives at least one command from an initiation device, which is one of the plurality of devices of the media exchange network, and after identifying that the initiation device is a member of the media exchange network, allowing the initiation device to link to the appliance to access the appliance 3. The method of claim 2, wherein when the initiation device is not a member of the media exchange network, the media processing system verifies authorization of the initiation device, based on the at least one command, and communicates with the appliance for the access.

4. The method of claim 1, wherein when enabling the communication with the appliance, the communication is with a home appliance.

5. The method of claim 4, wherein when enabling the communication with the appliance, the communication is with a dishwasher, a refrigerator, a microwave oven, a clothes washer or a clothes dryer.

6. The method of claim 4, wherein when enabling the communication with the appliance, the communication is with a heating system, an air conditioning system or a hot water heater.

7. The method of claim 1, wherein when enabling the communication with the appliance, the link is over a local area network.

8. An apparatus for controlling an appliance using a media exchange network, comprising:
- a communication interface configured to communicate with a plurality of appliances over a home network and with a plurality of devices selected to form a media exchange network for exchanging media content within a closed and secure network environment formed by the media exchange network; and
- a processor, configured with the communication interface, to provide processing to exchange the media content within the media exchange network and to identify one or more appliances for accessing by the media exchange network, wherein the processor enables an access to a particular appliance by configuring a link to the particular appliance in response to receiving a command from an initiation device.

9. The apparatus of claim 8, wherein the processor enables the access to the appliance by the initiation device by allowing the initiation device to link to the particular appliance after identifying that the initiation device is a member of the media exchange network.

10. The apparatus of claim 9, wherein the processor enables the access via the processor only after verifying authorization of the initiation device to access the particular appliance, when the initiation device is not a member of the media exchange network.

11. The apparatus of claim 8, wherein the apparatus is a set-top-box.

12. The apparatus of claim 8, wherein the apparatus is a television.

13. The apparatus of claim 8, wherein the apparatus is a personal computer.

14. The apparatus of claim 8, wherein the particular appliance is a dishwasher, a refrigerator, a microwave oven, a clothes washer or a clothes dryer.

15. The apparatus of claim 8, wherein the particular appliance is a heating system, an air conditioning system or a hot water heater.

16. An apparatus at a first location having a media processing system to exchange media content and to access appliances, comprising:
- a communication interface configured to communicate with a plurality of appliances over a home network and to communicate over a media exchange network to exchange media content among a plurality of devices selected to form the media exchange network for exchanging the media content and the communication interface to receive a command from an initiation device at a second location to access a particular one of the plurality of appliances; and
- a processor, which provides processing for the media processing system and configured to operate with the communication interface to receive the command, is configured to identify the plurality of devices of the media exchange network and is configured to identify the plurality of appliances, wherein when the initiation device is one of the plurality of devices of the media exchange network, the command is linked to the particular appliance and when the initiation device is not one of the plurality of devices of the media exchange network, the processor is to verify authorization of the command and to communicate with the particular appliance for the access to the particular appliance.

17. The apparatus of claim 16, wherein the apparatus is a set-top-box, television set or a personal computer.

18. The apparatus of claim 16, wherein the particular appliance is a dishwasher, a refrigerator, a microwave oven, a clothes washer, or a clothes dryer.

19. The apparatus of claim 16, wherein the particular appliance is a heating system, an air conditioning system, or a hot water heater.

20. The apparatus of claim 16, wherein the initiation device is a third party service provider.

* * * * *